United States Patent [19]

Calvert

[11] 4,266,951
[45] May 12, 1981

[54] PARTICLE SCRUBBER AND RELATED METHOD

[75] Inventor: Seymour Calvert, San Diego, Calif.

[73] Assignee: Air Pollution Technology, Inc., San Diego, Calif.

[21] Appl. No.: 17,182

[22] Filed: Mar. 5, 1979

Related U.S. Application Data

[63] Continuation of Ser. No. 906,000, May 15, 1978, abandoned.

[51] Int. Cl.³ .............................................. B01D 53/14
[52] U.S. Cl. .................................. 55/84; 55/257 PP; 239/545; 261/118
[58] Field of Search ............... 55/84, 94, 220, 257 PP, 55/257 MP, 259, 1, 461; 239/545, 543; 261/115, 118, 117

[56] References Cited

U.S. PATENT DOCUMENTS

| 536,216 | 3/1895 | Luther et al. | 239/545 X |
|---|---|---|---|
| 1,538,779 | 5/1925 | Allgrunn et al. | 239/545 X |
| 2,410,215 | 10/1946 | Houghton | 239/545 X |
| 3,248,860 | 5/1966 | Carlson | 261/118 X |
| 3,334,470 | 8/1967 | Huppke | 55/94 X |
| 3,435,106 | 3/1969 | Hager | 264/117 X |
| 3,763,634 | 10/1973 | Alliger | 55/259 X |

FOREIGN PATENT DOCUMENTS

| 17369 | of 1892 | United Kingdom | 239/545 |
|---|---|---|---|
| 621785 | 4/1949 | United Kingdom | 239/421 |

Primary Examiner—Robert H. Spitzer
Attorney, Agent, or Firm—Richard H. Zaitlen

[57] ABSTRACT

A scrubber device for removing finely divided contaminants from a gas stream is disclosed. The device comprises first and second conduits each of which has an inlet and an outlet with nozzle means and flow guide means disposed adjacent the end of each outlet. The nozzles are configured such that the flow path of the discharge of the first conduit intersects the flow path of the discharge of the second conduit. The flow guide means are configured so as to regulate the flow path of the gas stream through each conduit such that a collision zone is created thereinbetween. Further, the flow guides act so as to improve the collection efficiency of the scrubber. In this manner, contaminants in each respective stream are caused to be removed by inertial impaction. By the use of the scrubber device of the present invention, even finely divided contaminants in the order of 0.1 microns diameter to 3 microns diameter can be removed.

10 Claims, 5 Drawing Figures

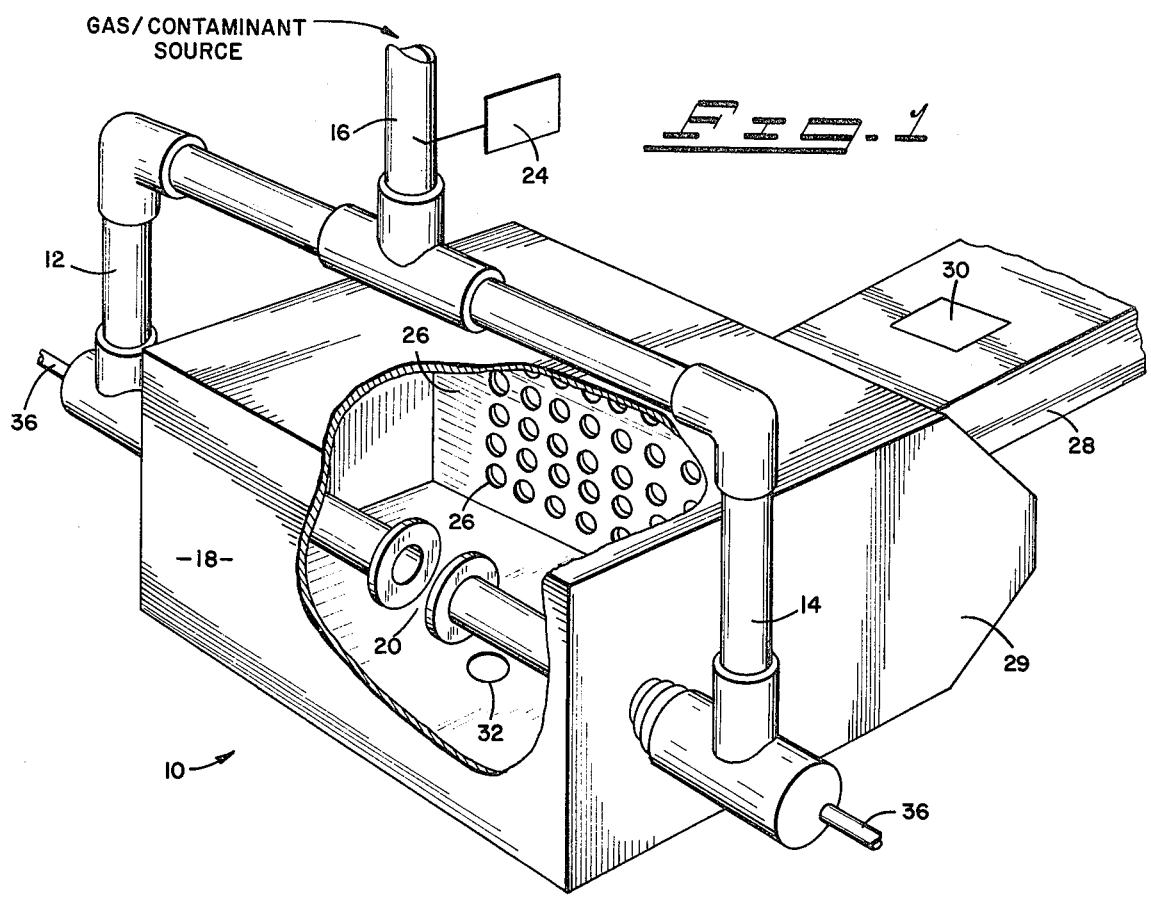
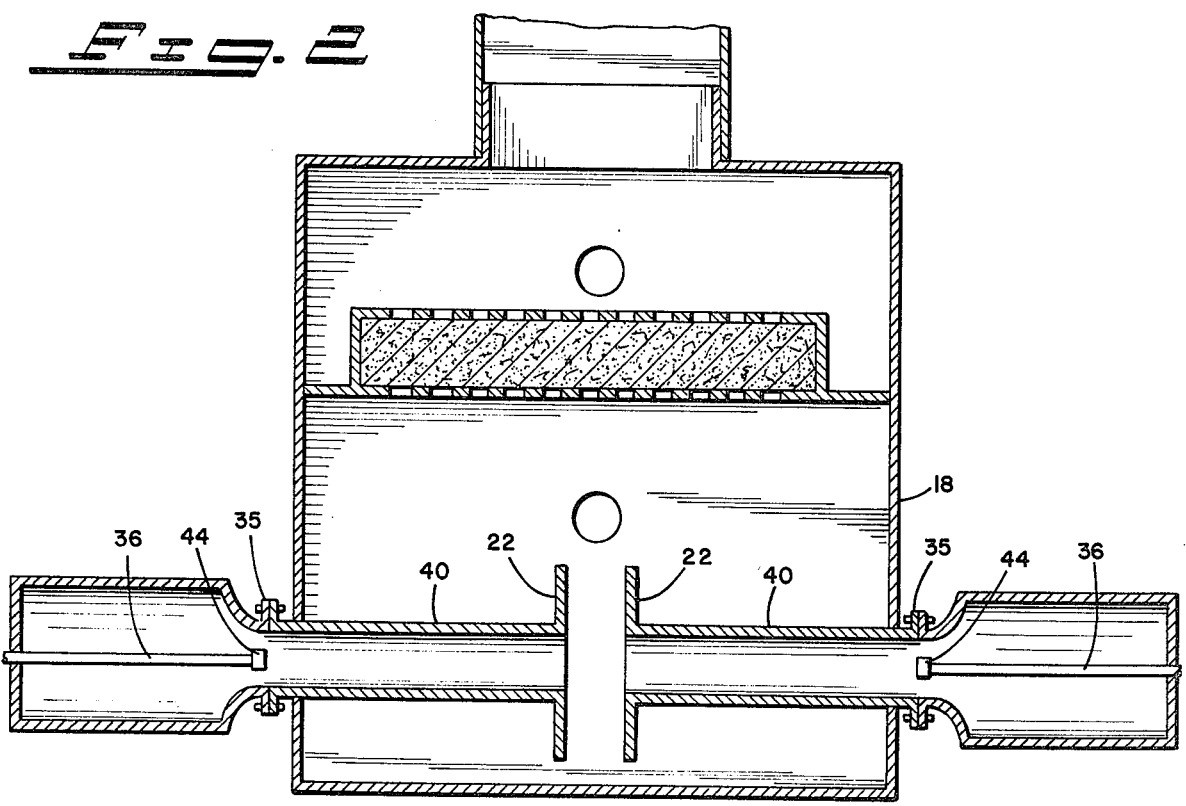

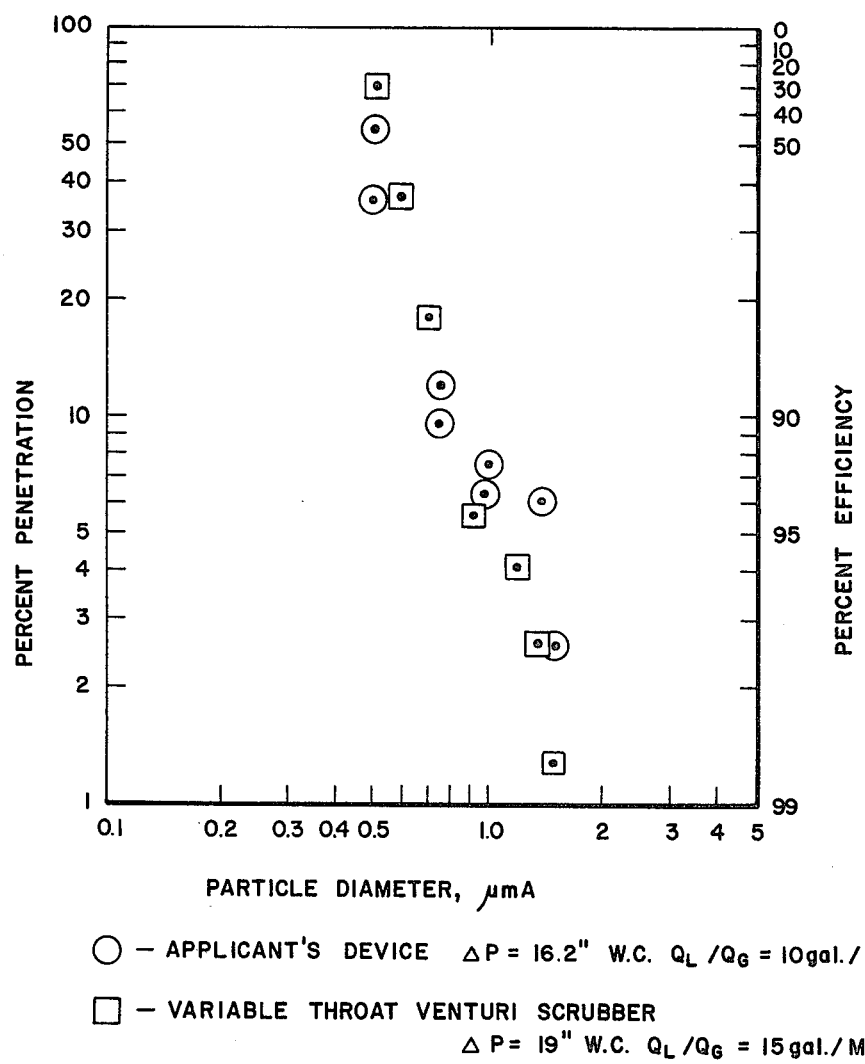

PARTICLE SCRUBBER AND RELATED METHOD

BACKGROUND OF THE INVENTION

1. Related Application

This application is a continuation in part of application Ser. No. 906,000, filed May 15, 1978, now abandoned.

2. Field of the Invention

The present invention relates to particle scrubbers, and more specifically, to a scrubber device adapted to remove finely divided contaminants from a gas stream.

3. Prior Art

Concern over the environment has been recognized as being one of the most important problems facing today's society. In the past, many industries operated in such a manner so as to release to the atmosphere huge quantities of contaminants, such as, for example, gas contaminants and other small particulate materials. Many cities suffered the blight of having their atmosphere adversely affected by such contaminants. Not only is this unsightly, but such contaminants are believed to be related to certain health problems. Most industries have recognized the responsibility to deal with the problem of pollution and have devised various means to control their effluent so as to remove many of the pollutant therefrom. In fact, an entire area of technology has evolved in connection with pollution control apparatus and related methods. While the prior art teaches the various techniques to deal with the various types of air and water pollution, it has been found that the smaller the particle in the fluid stream, the more difficult the removal. Thus, while there are a number of prior art devices, especially in connection with removing particulate matter from air, such devices have not proved to be as effective when the particulate matter is extremely small. Even with respect to those few devices which can remove very small particulate matter, such devices suffer the shortcomings of being expensive and/or complex. In addition, such devices usually have high power requirements and tend to wear out quickly because of the abrasion and erosion caused by the action of the high velocity gas, liquid and particle streams.

As indicated hereinabove, a number of devices referred to as "scrubbers" are available for removing particulate matter. However, before selecting a specific scrubber, a number of considerations should be taken into account. For example, the basic mechanism for particle collection from a gas stream should be considered. These mechanisms include: (1) gravitational sedimentation (this mechanism is usually of little importance for any particles small enough to require consideration of a scrubber); (2) centrifugal deposition (particles are "spun out" of a gas stream by a centrifugal force induced by a change in gas flow direction. These mechanisms have been found to be not very effective on particles smaller than about 5.0 microns in diameter); and (3) inertial impaction and interception (when a gas stream flows around a small object, the inertia of the particles causes them to continue to move toward the object where some of them are collected. Inertial impaction customarily describes the effect of small-scale changes in flow direction).

Because inertial impaction is effective on particles of extremely small diameters, i.e., 0.1 micron, it has been one of the important collection mechanisms for particle scrubbers. Since this mechanism hinges on the inertia of the particles, both the size and density of the particles are important considerations in determining the ease with which they may be collected. Thus, another consideration in determining the specific type of scrubber to be used is the particle diameter. It is been found that the aerodynamic diameter is a more accurate term defining the properties of a particle than the average diameter, and is defined as follows:

$$d_{pa} = d_p(\rho_p C')^{\frac{1}{2}}$$

where
$d_{pa}$ = particle aerodynamic diameter, $\mu$mA;
$d_p$ = particle physical diameter, $\mu$m; and
$C'$ = Cunninghams correction factor, dimensionless.

Other mechanisms which may be considered include Brownian diffusion, thermophoresis, diffusiophoresis, electrostatic precipitation and particle growth.

A brief description of some of the various prior art scrubbers will now be presented.

One of the most well known types of prior art scrubbers is a scrubber referred to as a "plate scrubber." A plate scrubber consists of a vertical tower with one or more plates mounted transversely inside. Gas comes in at the bottom of the tower and must pass through perforations, valves, slots, or other openings in each plate before leaving through the top. Usually, liquid is introduced through the top plate and flows successively across each plate as it moves downward to the liquid exit at the bottom. The gas passing through the opening in each plate mixes with the liquid flowing over it. Gas-liquid contacting causes the mass transfer or particles removal for which the scrubber was designed. With respect to plate scrubbers, the chief mechanism of particle collection is inertial impaction from the gas impinging on the liquid or on the solid members. Particle collection may be aided by atomization of the liquid flowing past openings in the perforated plates. It is presently believed that collection efficiencies increase as the perforation diameter decreases which enable a cut diameter of 1.0 $\mu$mA for $\frac{1}{8}$" diameter holes in a sieve plate. Thus, it can be seen, that while the plate scrubber is somewhat effective, it is limited in terms of the size of particles that it can remove.

Yet another type of device is referred to as a "preformed-spray scrubber." A preformed spray scrubber collects particles or gases on liquid droplets that have been atomized by spray nozzles. The properties of the droplets are determined by the configuration of the nozzles, the liquid being atomized and the pressure to the nozzles. Sprays leaving the nozzles are directed into a chamber that has been shaped so as to conduct the gas through the atomized droplets. Horizontal and vertical gas flow paths have been used, as well as spray-entry flowing concurrent, countercurrent or crossflow to the gas. If the tower is vertical, the relative velocities between the droplets and the gas is ultimately the terminal settling velocity of the droplets.

An ejector venturi is another type of preformed-spray scrubbing device in which a high-pressure spray is used both to collect particles and to move the gas. High relative velocity between the droplets and the gas aid in particle separation. Preformed sprays have also been used in venturi scrubbers in which a fan is used to overcome a high gas-phase pressure drop.

Particle collection in these preformed-spray devices results from inertial impaction on the droplets. Efficiency is believed to be a complex function of droplet size, gas velocity, liquid-gas ratio and droplet trajectory. There is often an optimum droplet diameter which varies with fluid flow parameters. For droplets falling at their terminal settling velocity, the optimum droplet diameter for fine particle collection is believed to be around 100 to 500 μm; for droplets moving at high velocity within a few feet of the spray nozzle, the optimum is smaller.

Yet another type of scrubber is one referred to as a "gas-atomized" spray scrubber which uses a moving gas stream to first atomize liquid into droplets, and then accelerates the droplets. Typical of this type of device is a venturi scrubber. High gas velocities of 100–500 ft./sec. raise the relative velocity between the gas and the liquid droplets, and promote particle collection. Many gas-atomized spray scrubbers incorporate the converging and diverging sections typical of the venturi scrubber, although increase in benefits is not necessarily achieved. Liquid is usually introduced in various places and in different ways in such devices without much effect on collection efficiencies. Particle collection results from internal impaction due to gas flow around the droplets. Velocity is high and droplet residence time short such that diffusional collection and deposition by other forces, such as thermophoretic forces, are not very effective. It is presently believed that cut diameters down to approximately 0.2 μma can be achieved with various venturi scrubbers.

Other types of scrubbers include centrifugal scrubbers, baffle and secondary-flow type scrubbers, impingement and entrainment scrubbers, and moving bed scrubbers.

Yet other examples of prior art devices are disclosed in U.S. Pat. No. 3,826,063 and 3,972,696. In the '063 patent, an electrostatic agglomeration device is disclosed which is used for air filtering and conditioning system. The device comprises an air duct having a pair of channels disposed either within the duct or adjacent thereto and opening into the duct at both ends. A plurality of electrically conductive rods are disposed in the channel and are charged electrically positive in one channel and negative in the other channel. As particulate matter flows into the channels, it is ionized by the charges of the electrical rods and agglomerated to form larger particle masses which are more easily filterable from the air flowing through the system. As can be easily recognized, a rather complex and expensive device is disclosed which, while perhaps useful in certain limited applications, has distinct limitations in industrial settings.

In the '696 patent, the device disclosed therein relates to an apparatus for removing fly ash from a gas stream and comprises three concentric vertical stacks or chimneys wherein the outer stack is higher than the inner stack. As exhaust flue gases are directed through the central stack, upon exiting they expand laterally such that the fly ash is captured by the intermediate stack and drops down in the annular space formed thereinbetween. Again, such device suffers from being rather complex and therefore limited in its commercial applicability. Other similar devices and apparatus are disclosed in U.S. Pat. Nos. 3,332,214; 3,334,470; 3,435,593; 3,549,336; 3,463,098; and 4,082,522.

As indicated hereinabove, scrubber performance can be defined in terms of the cut diameter (dp50). Because particle collection efficiency changes with particle size for a given operating condition in a scrubber, one needs the relationship between efficiency and particle size. Most scrubbers that collect particles by internal impaction perform in accordance with the following relationship:

$$Pt = \exp - (A\, d_{pa}B) = \frac{c_o}{c_i}$$

where
Pt = particle penetration, fraction;
A = empirical constant, dimensionless;
B = empirical constant, dimensionless;
$C_i$ = inlet particle concentration, g/cm$^3$; and
$C_o$ = outlet particle concentration, g/cm$^3$ Packed bed and plate type scrubbers performance are described by a value of B=2.0, whereas for centrifugal scubbers of the cyclone type, B=0.7. Gas atomized scrubbers have a value of B=2.0 over a large portion of the usual operating range. Therefore, by using the value of B=2.0 as representative of most scrubbers operating in the inertial impaction regime, and plotting the collection efficiency against the ratio of aerodynamic particle diameter to performance cut diameter, a graphical representation may be obtained. For many prior art devices, performance, especially for fine particles, was very low. Thus, there exists a long felt need for a device which while able to remove finely divided particulate material, is also efficient and does not require a huge power input.

The present invention represents an advancement in the art of air pollution control, and contains none of the aforementioned shortcomings associated with the prior art devices. The present invention provides a relatively simple and straight-forward solution to the problem of removal of small particulate matter which otherwise would escape into the atmosphere.

BRIEF SUMMARY OF THE INVENTION

The present invention is directed to a apparatus and method for cleaning a stream of gas. It is primarily directed to the removal of small particulate matter from the gas stream by means of wet scrubbing. However, the device of the present invention can also be used dry, that is, without the use of additional water or other cleaning liquids. It can be used to agglomerate liquid drops which may be present in the gas stream, and also for mass transfer, that is, the removal of gaseous species from the gas stream by means of absorption of adsorption.

The device, in a broad description, operates by reason of collisions of gas jets. The gas may contain either particulate or gaseous material which are both referred to herein as contaminants. Such term would also encompass a combination of particulate and gaseous contaminants.

The major mechanism of particle collection of the device of the present invention is inertial impaction. As discussed hereinabove, inertial impaction refers to the collision of one particle with another particle or with a surface. While the device is configured such that the gas stream may flow around the collector particle or collection surface, the particle being collected has sufficient inertia that it is unable to follow the gas stream sufficiently to prevent its collision. The use of inertial impaction in the present invention represents an important collection mechanism for particles which are about 0.1 micron in diameter and larger. It is therefore of major importance in the size range which has been designated by the Environmental Protection Agency as the "fine particle" range.

When liquid is present or introduced into the gas stream formed in the device of the present invention, it is usually atomized into drops by the action of the high velocity gas stream. These drops also serve to collect particulate matter by interial impaction and the other mechanisms discussed hereinabove.

During the time when the individual gas jets are flowing prior to collision, particles will be collected by the entrained drops. Thus, the particle collection process in the individual gas jet will be the same as it would be in the throat of a venturi scubber or similar device. When collision occurs between intersecting streams there will be further atomization of the liquid into extremely fine drops and further collection of particles and mass transfer upon these drops. Thus, the collision of the gas streams with sufficient velocity to cause removal of the contaminants by inertial impaction represents another distinct improvement over the prior art.

The advantage of colliding gas jet streams is based on the following. In the conventional types of gas atomized or preatomized scrubbers, the highest relative velocity between the contaminant particles and collector particles (such as the drops) is the velocity of the gas jet relative to the liquid at its point of introduction. The drops in a well designed venturi scrubber will generally obtain a velocity which is 80 to 90 percent of the gas velocity. With the device of the present invention, on the other hand, the relative velocity between the contaminant particle and the collector particle can approach twice the gas jet velocities when the respective orifices face each other in axial alignment, and the gas in each stream is traveling at the same velocity when they collide.

Because of the high relative velocity between the collector particles and the gas stream containing the contaminants upon collision, the efficiency of intertial impaction will be higher in the device of the present invention than would be possible if the relative velocity were limited by the velocity of a single gas jet. As a further consequence of the increased collision efficiency, the gas phase pressure drop required to obtain a given degree of scrubbing will be less in the device of the present invention than in conventional gas atomized or pre-atomized type scrubbers.

In application Ser. No. 906,000, a number of advantages were discussed with respect to the specific configuration shown therein. While such configuration does lead to superior results as compared with scrubbers of the prior art, the present invention represents yet an additional and significant improvement in this type of collision scrubber. While not to be bound by any theory, it is believed that the "flow guides" described in detail herein, permit greater focusing of the collision zone thereby leading to improved collection efficiencies over the device described in the parent application. In the device of the present invention, a housing is configured so as to form an impaction chamber. Means for directing a gas stream generating source to said chamber provide the chamber with a gas stream containing the undesirable small particulate material to be removed. First and second gas conduits are disposed in the chamber and are joined to the directing means. Each of the conduits has at least one discharge nozzle adjacent one end thereof. The nozzles are arranged on the first and second conduits so as to be in a spaced apart and opposed configuration. In this manner, the flow path of the discharge of the first conduit intersects the flow path of the discharge of the second conduit. Preferably, each of the conduits are supplied with a source of liquid such that the liquid is caused to intersect the flow path of each gas stream as it flows through the associated conduit. Finally, flow guide means are disposed on the discharge end of the first and second conduits thereby regulating the flow path of the gas streams through each conduit.

In the device of the present invention where liquid is introduced into both gas jets of a colliding pair, the following occur:

1. Each jet gives the same scrubbing efficiency that it would if it were a conventional (non-colliding) gas-atomized scrubber;

2. In addition to the conventional efficiency, the jet collision causes more particle collection and mass transfer;

3. The major power input is used to accelerate the liquid in the individual jet to near the gas velocity. Very little of this power is regained in a conventional gas-atomized scrubber. Thus, the jet collision scrubber of the present invention utilizes the momentum of the liquid in a more effective manner than the prior art gas-atomized scrubbers to obtain very fine drops and higher collision efficiencies for fine particles; and 4. The extremely fine drops formed by the jet collision provide more surface area for mass transfer than in conventional scrubbers.

5. The flow guides help contain the collisions between the two streams thereby insuring the efficiency of removal of the contaminants.

The novel features which are to believed to be characteristic of this invention, both as to its organization and method of operation, together with further objectives and advantages thereof will be better understood from the following description considered in connection with accompanying drawings in which a present preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view showing the scrubber device of the present invention;

FIG. 2 is a cutaway view showing the internal aspects of the scrubber device of the present invention;

FIG. 5 is a graph showing penetration efficiency.

DETAILED DESCRIPTION OF THE INVENTION

Figure 3:
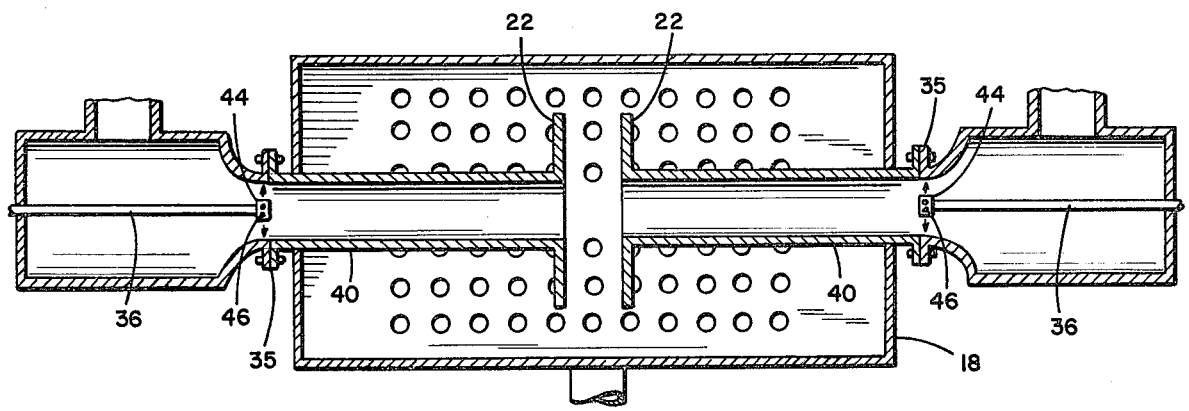
FIG. 3 is yet another view of the scrubber device of the present invention.

Referring first to FIG. 1, one can see the scrubber device 10 of the present invention. The device 10 has a first conduit 12 and a second conduit 14 extending outwardly from a central feed line 16. The first and second conduits 12 and 14 feed into a housing forming impaction chamber 18. As is more fully discussed hereinbelow, the first conduit 12 and the second conduit 14 are formed such that the discharge from each of these respective conduits intersects and forms an area of impaction generally desigiated by numeral 20.

Supplying feed line 16 is a gas/contaminant source. Such source may come from a boiler, smokestack, and the like, and contains finely divided contaminants. Disposed along the length of feed line 16 is a sampling device 24. Sampling device 24 is well known in the art and will not be discussed in detail herein. Sampling device 24 is used to determine the amount of contaminants which are carried by the incoming gas/contaminant stream.

An entrainment separator 26 is disposed in chamber 18 adjacent one side thereof. Such entrainment separators generally have a plurality of openings 26a passing therethrough which permits the effluent of the respective conduits 12 and 14 to travel out of the chamber 18. In this manner, further contaminants are removed from the gas stream by the entrainment separator 26. Of course, it is to be understood that a variety of entrainment separators are within the scope of the present invention. Disposed on the other side of the entrainment separator 26 is an air duct 28 which channels the gas from chamber 29 to a desired point of exit. A second sampler 30 is disposed along air duct 28 in such a manner so as to be able to determine the percentage of contaminants in the discharge from the device 10. Comparing the amount of contaminants entering the device 10 via device 24 as well as the amount of contaminants leaving chamber 18 by device 30 enables one to determine the efficiency.

The chamber 18 is also equiped with a drain port 32 adjacent the bottom thereof such that if the device 10 is used by introducing water or another cleaning liquid into the inlet gas streams by means of water conduits 36, such liquid is permitted to drain out of the device 10 via drain port 32.

Referring now to FIGS. 2 and 3, one can see in greater detail the various aspects of the chamber 18. More specifically, one can see that the first and second conduits 12 and 14, have a substantially straight discharge 40 disposed adjacent the end thereof of means of flange members 35. Also adjacent each end of conduits 12 and 14 is a generally circular flow guide member 22. Each flow guide member 22 is arranged and configured such that the discharge from the first and second conduit are caused to collide in a collision zone formed between members 22. In the preferred embodiment, guides 22 are parallel and spaced apart. It is understood, that they can be angled so as to provide for gradually increasing area for flow. To further increase the collision between the discharges of each respective conduit, nozzles 40 are arranged and configured such that discharge from each of the nozzles intersects or impacts upon one another in a generally in line manner.

It has also been found that by providing the gas jet stream with small particles of water, or of another cleaning liquid, further aids in contaminant removal. Accordingly, along the length of each of the nozzles 40, water tube 36 are disposed. Each water tube 36 has a cap 44 adjacent the outlet end thereof. Outlets 46 formed on cap 44 permit the introduction of water into the gas stream as indicated by the arrows shown in FIG. 3. It should be understood, however, that the wide variety of water outlets are within the scope of the present invention although the preferred outlet is such that the flow path of water is substantially perpendicular to the flow path of the gas stream in the region of the highest gas velocity. This is thought to cause a better interaction between the contaminants in the gas stream and the water particles formed as the water exits out of tube 36.

The operation of the device 10 of the present invention will now be described.

Referring to FIGS. 1, 2 and 3, one can see that the generally rectangular chamber 18 has first conduit 12 and second conduit 14 extending therein such that the respective discharge nozzles 40 and flow guide members 22 face one another. A gas stream containing the contaminants is caused to flow through feed line 16. Such gas stream comes from a gas/contaminant source which could come from any industrial operation where fine particulate contaminants are a problem.

In the preferred embodiment, feed line 16 forms the means by which the gas from the gas stream generating source is directed into each of the conduits 12 and 14.

After the gas stream has been divided into two generally equal streams, it is caused to flow through the discharge nozzles 40 as illustrated in FIGS. 2 and 3. Discharge nozzles 40 are located at each end of conduits 12 and 14. Water, or another scrubbing liquid or suspension, may be introduced through spray outlet nozzles 46. As the gas flows through the discharge nozzles 40 at relatively high velocities (i.e., 100 to 500 feet per second) the liquid is atomized, the drops are accelerated by the gas, and particle collection and mass transfer occur. Depending on the time of contact between the gas and liquid, the drops can reach a high percentage of the gas velocity (approximately 80 to 90 percent).

The high velocity gas and the entrained drops are then caused to collide in the chamber 18 in the area impact 20 which is formed between the flow guide members 22. When these streams intersect each other, the fine particles are caused to be removed by inertial impaction. The now cleaned gas is directed out of chamber 18 through the entrainment separator 26 and into the final chamber 29. Any liquid droplets which collect in the chamber 18 flow out of the device 10 through the drain 32. The now cleaned gas is directed out of the device 10 through outlet duct 28. Here a second sampler 30 is located which also measures the amount of contaminants contained in the outflow so as to be able to calculate the percent of contaminant removal.

As discussed herein, and as illustrated in FIGS. 1-3 the discharges from each of the nozzles 40 are caused to impinge upon one another at an angle of approximately 180 (i.e. in a spaced apart and axial aligned configuration). It is to be understood, however, that other angles of impact are within the scope of the present invention. As taught in related application, Ser. No. 906,000, a variety of other configurations for the nozzles 40 are within the scope of the present invention.

EXAMPLES

A device as illustrated in FIG. 1 was constructed with two 3 inch diameter pipes used as the discharge nozzles 40. Two water nozzles were used to introduce water into the respective contaminant-containing gas inlet streams. Mounted adjacent each end of the nozzles 40 are outwardly extending flanges 22 so as to form a 2 inch gap thereinbetween. In the tests, the water was introduced into each stream of gas. The nozzles were located such that the water spray would strike the nozzle just inside of the entrance where water was sprayed out at a rate of 2.5 to 10 gallons per thousand cubic feet of air (gal/MCF).

With respect to the experimental data obtained from the device according to application Ser. No. 906,000, reference is made to Tables 1 and 2 set forth hereinbelow. By plotting the cut diameter versus the scrubber pressure drop, one can determine the cut diameter and like information. From such a plot, for a pressure drop of approximately 8 inches WC and higher, this type of scrubber would be efficient for removing sub-micron diameter particles.

TABLE 1

SCRUBBER TESTS WITH SPRAY WATER INJECTION

| Run # | ΔP, in. W.C. | L/G, gal/MCF | | $d_{p50}$, μmA |
|---|---|---|---|---|
| 1 | 8 | 7 | | N.A. |
| 2 | " | " | | N.A. |
| 3 | " | " | | 0.6 |
| 4 | " | " | | 0.6 |
| 5 | " | 2.5 | | <0.5 |
| 6 | " | 10 | | 0.85 |
| 7 | 5 | 7 | | 1.1 |
| 8 | " | " | | 1.1 |
| 9 | " | 10 | approx. | 0.4 |
| 10 | " | " | | 1.0 |
| 11 | 8 | " | | N.A. |
| 12 | 12.5 | 7 | | 1.0 |
| 13 | " | " | approx. | 0.4 |
| 14 | " | 2.5 | " | 0.45 |
| 15 | " | 2.5 | " | 0.45 |

TABLE 2

SCRUBBER TESTS WITH JET WATER INJECTION

| Run # | ΔP, in. W.C. | L/G, gal/MCF | $d_{p50}$, μmA |
|---|---|---|---|
| 2-1 | 13 | 7 | 0.55 |
| 2-2 | " | " | 0.55 |
| 2-3 | " | 15.5 | 0.37 |
| 2-4 | " | " | <0.3 |
| 2-5 | 9 | 7.5 | " |
| 2-6 | " | " | " |

Figure 4:
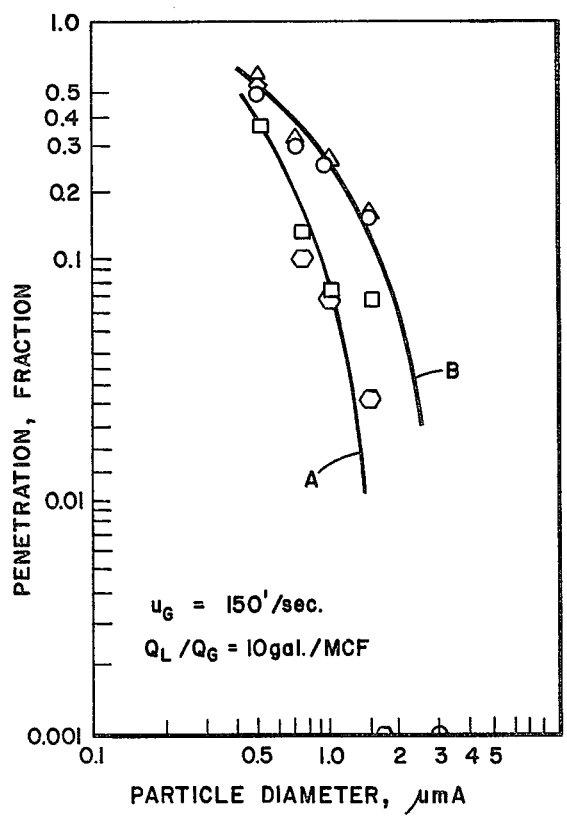
FIG. 4 is a graph showing scrubber performance.

Referring now to FIG. 4, the device 10 of the present invention is compared to the device in application Ser. No. 906,000. The present invention is shown in curve A and the prior device is shown in curve B. One can see that for a 2 inch gap between the flow guide members 22, the scrubber device 10 of the present invention gives substantially better performance in terms of lower particle penetration at the same gas velocity and liquid/gas ratio.

Referring now to FIG. 5, one can see that the device of the present invention gives the same penetration as a venturi scrubber when operated with less pressure drop (16.2" W.C.) and liquid/gas ratio, $Q_L/Q_G$, (10 gal/MCF) than the venturi. The venturi had a pressure drop of 19" W.C. and a liquid/gas ratio of 15 gal/MCF. Thus, for a given pressure drop, better particle collection efficiency can be achieved by the device 10 and less water is required. While not to be bound by any theory, it is believed that such improved results are due, at least in substantial part, by the improved characteristics of the collision zone formed between the flow guide members 22.

In further explanation of the present invention, one can view the device 10 as being divided into three basic parts: (1) the throat section (the distance traveled by the gas jet between the point of liquid introduction and the point of collision) (2) the "collision zone"; and (3) the "fog zone" (the region between the collision zone and the entrainment separator).

THE THROAT SECTION

Particle collection efficiency was found to depend upon the collection efficiency of the individul water droplets and the number of water droplets which the gas stream encountered. Both the efficiency of a drop and the number of drops are at maximum when the water is first introduced and decreases as the drops are accelerated and the relative velocity between the drops and gasses decreases.

The collection efficiency of the throat section for a given particle size is believed to depend upon the effective length of the throat section. Once the drop has reached nearly the gas velocity, there is little benefit in continuing the contact between liquid and gas. The relationship between drop velocity and throat length is illustrated by the data in the following tabulation:

TABLE 3

| Throat Length, $L_T$, ft | 0.5 | 0.75 | 1.0 | 1.5 | 2.0 |
|---|---|---|---|---|---|
| Velocity ratio $F_L$ | 0.76 | 0.81 | 0.85 | 0.9 | 0.92 |

The ratio of the drop velocity at the end of the throat to the gas velocity in the throat, $F_L$, has been predicted as a function of the throat length, $L_T$, for 100.0 diameter water drops in the gas stream. As can be seen from Table 3, with a throat length of one foot, the drops will reach approximately 80% of the gas velocity and therefore the relative velocity between the drops and the gas will be about 15% of the gas velocity. If the gas velocity were two hundred feet per second, the relative velocity would decrease to thirty feet per second.

For a given liquid/gas ratio, the drop holdup is proportional to the ratio of gas velocity to drop velocity, thus, to the reciprocal of $F_L$. Thus, it can be seen that as the drops are accelerated both the collision efficiency of a drop and the drop holdup decrease. Since the scrubber collection efficiency is dependent upon the product of drop holdup and collection efficiency for a single drop, the effectiveness of the scrubber is greatest over the initial part of the throat. Based on the above, the length of the throat is chosen to be one to three feet, and preferably, one to two feet. Other throat lengths are within the scope of this invention.

COLLISION ZONE

When a pair of gas jets and their entrained liquid drops collide, several phenomena have been found to take place. Some of the drops will collide with drops moving in the other direction and will shatter into smaller drops. These smaller drops will have a particle collection efficiency during the period when their relative velocity to the gas stream is high. Because the drops are small, they will be more rapidly accelerated than larger drops. Other drops will penetrate into the opposing jet and will transfer their momentum to the gas. In the process of being slowed down and moved in a radially outward direction, the drops will collect particles from the gas.

The use of the flow guide members 22 which are preferably discs but may also have other configurations provide a means for pressure recovery from the high velocity gas and liquid stream. By the use of such members, for a given pressure drop better particle collection efficiency is achieved with less water than that of prior art scrubbers. In the preferred embodiment, the outside diameter of the flow guide is three times that of the throat. If the spacing between the two flow guide members 22 is uniform, the outlet (radial) flow area is three times that of the inlet radial flow area (i.e., the cylindrical area for flow formed between the two nozzles 40).

Thus, the velocity head at the outlet (i.e., through the cylindrical area for flow adjacent the periphery of the flow guides 22) would be 1/9 times that of the inlet radial flow area where the gas enters the flow guide, if the velocity distribution were regular. The spacing can be varied such that the relationship between the flow area and the radial position is as desired. Thus, the pressure region in the radial flow region which acts essentially as a diffuser, would be optimized.

FOG ZONE

The particle collection efficiency in the fog zone is believed to be related to diffusion and to a lesser extent upon inertial impaction. The major contribution of the fog zone in the performance of diffusional transfer operation such as the collection of submicron particles and gas absorption.

While a wide variety of theortical considerations as well as specific configurations have been disclosed and described herein, the conditions which readily give satisfactory operation of the scrubber device 10 of the present invention are as follows: 1. Uniform distribution of water across the gas stream in the throat section. This causes more complete atomization of the liquid and higher collection efficiency in the throat section; 2. The throat length should be sufficient that atomization can occur. Note that the throat length is not restricted to that enclosed by the nozzles. The gas stream emerging from the nozzle can continue to accelerate the liquid for some distance before it diffuses; 3. The jets are aligned such that the jets will collide in axial alignment, i.e. 180° apart in the preferred embodiment; 4. The flow guide members 22 have a maximum area for radial flow which is approximately 3 times that of the inlet radial flow area; and 5. Uniform liquid distribution between the pairs of jets. It is desired because it will equalize gas flow and collection efficiency in both throat sections.

In terms of the preferred embodiment, the liquid distribution into the entrance of the nozzles should be in the form of a coarse spray or several jets of liquid directed so as to cause uniform distribution of liquid over the nozzle cross-section. The amount of liquid used can vary from 2.5 to about 25 gallons per thousand cubic feet of gas passed through each conduit 12 and 14 respectively. A substantially straight nozzle of approximately one foot in length has found to produce extremely good results as it provides each jet that much distance for liquid acceleration. This also helps insure that in the event of unequal liquid distribution between the throat sections, the collison zone will be located close enough to the midpoint between the nozzles such that each throat section will have had the opportunity for substantially complete drop acceleration. The gas jets are preferably directly opposed one another, and the distance between the nozzle ends is regulated by the volumetric gas flow and the velocities desired in the collision and fog zones. In the preferred embodiment, the distance between the nozzle ends is approximately ½ to 5 nozzle diameters and the velocity of each of the gas streams is approximately 100 feet per second to approximately 500 feet per second.

It should be understood that in the examples described herein various shapes such as cylindrical shapes are described, other configurations can be used using the same principles. It will thus be apparent to one of skill in the art that other changes and modifications can be made without departing from the sphere or scope of the present invention as defined and claimed herein. For example, while the various conduits and chambers are generally made up of metal, other materials such as plastics reinforced materials, concrete and like are also within the scope of the present invention. The chamber 18 is shown as having a box-like rectangular construction. However, a cylindrical chamber is also within the scope of this invention. Further, various configurations other than circular can be used for the gas discharge nozzles 40. For example, the nozzles 40 can have rounded or convergent inlets whichtend to reduce pressure drop, or they can have a generally rectangular cross-section. Likewise, flow guides 22 can also have a generally rectangular configuration. Finally means for moving the water nozzles 46 along the length of the discharge nozzles 40 are also within the scope of this invention. This invention, therefore, is not to be limited to the specific embodiments described and disclosed herein.

What is claimed is:

1. A scrubber for removing finely-divided contaminants from a gas stream by inertial impaction comprising a housing forming an impaction chamber, a gas stream generating source, first and second conduits disposed in said chamber, each said conduit having an inlet and an outlet, means for directing said stream containing said finely divided contaminants from said gas stream generating source to each said conduit, substantially straight nozzle means disposed adjacent each said outlet and configured such that the flow path of the gas stream through said first conduit intersects the flow path of the gas stream through said second conduit, and outwardly extending flow guide flange members disposed on said first and second conduits adjacent each said nozzle means, wherein the cross-sectional area for flow between the flange members just after collision is from about 1 to 10 times the combined cross-sectional area of both said nozzle means, said flange members and said nozzle means thereby regulating the flow path of the gas stream as it is discharged from each conduit such that improved collection efficiency of the contaminants is achieved.

2. A scrubber device according to claim 1 wherein said nozzle means on said first conduit is in substantial axial alignment with said nozzle means on said second conduit.

3. A scrubber device according to claim 1 wherein means for supplying a liquid is disposed in each said conduit adjacent the associated nozzle means.

4. A scrubber device for removing small particulate material from a gas stream by inertial impaction comprising:
   a housing forming an impaction chamber;
   means for directing a gas stream generating source to said chamber;
   first and second conduits disposed in said chamber and joined to said directing means, each said conduit having at least one discharge nozzle adjacent one end thereof, said discharge nozzle on said first conduit arranged in a spaced apart and opposed configuration with respect to said discharge nozzle on said second conduit such that the flow path of the discharge from said first conduit intersects the flow path of the discharge from said second conduit;
   means for supplying a liquid disposed in said device adjacent each said discharge nozzle, said means for supplying a liquid configured such that liquid is caused to intersect the flow path of said gas stream; and outwardly extending flow guide flange members disposed on said first and second conduits adjacent each said nozzle, wherein the cross-sectional area for flow between the flange members just after collision is from about 1 to 10 times the combined cross-sectional area of both nozzles, said flange members and said nozzles thereby regulating the flow path of the gas stream as it is discharged from each conduit such that improved collection efficiency of the contaminants is achieved.

5. A scrubber device according to claim 4 wherein the diameter of said flow guide means is approximately three times the inside diameter of said discharge nozzle.

6. A scrubber device according to claim 4 wherein said means for supplying a liquid comprises first and second tubes axially disposed within said first and second conduits, respectively, each said tube having a series of orthogonal openings configured to form a liquid spray.

7. A scrubber device according to claim 4 wherein each said flange member has a generally circular configuration.

8. A scrubber device according to claim 4 wherein each said flange member has a generally rectangular configuration.

9. A method for removing various finely divide contaminants from a gas stream by inertial impaction and interception comprising the steps of:

(a) passing a first stream of gas containing said contaminants through a first conduit having a first discharge nozzle and an outwardly extending flow guide means adjacent one end thereof;

(b) providing said first stream of gas with finely divided liquid droplets such that said droplets are entrained by said first gas stream and are caused to accelerate and to impinge upon said contaminants in said first gas stream so as to encourage the removal of said contaminants by inertial impaction;

(c) passing a second stream of gas containing said contaminants through a second conduit having a second discharge nozzle and an outwardly extending flow guide means disposed adjacent one end thereof;

(d) providing said second stream of gas with finely divided liquid droplets such that said droplets are entrained by said second gas stream and are caused to accelerate and to impinge upon said contaminants in said second gas stream so as to encourage removal of said contaminants by inertial impaction; and (e) controlling the direction and flow rates of said first gas stream through said first discharge nozzle and said second gas stream through said second discharge nozzle such that said streams are caused to intersect while maintaining a high relative velocity between the colliding streams, and to form a collision zone between said outwardly extending flow guide means, the cross-sectional area for flow between the outwardly extending flow guide means just after collision is from about 1 to 10 times the combined cross-sectional area of both nozzles, said outwardly extending flow guide means and said nozzles thereby regulating the flow path of the gas stream as it is discharged from each conduit such that improved collection efficiency of the contaminants is achieved.

10. The method according to claim 9 wherein the discharge velocity of each gas stream is between 100 to 500 feet per second.

* * * * *